2 Sheets—Sheet 1.
W. JENKS.
Breech Loading Fire Arm.
No. 22.
A. I. Patented July 9, 1839.
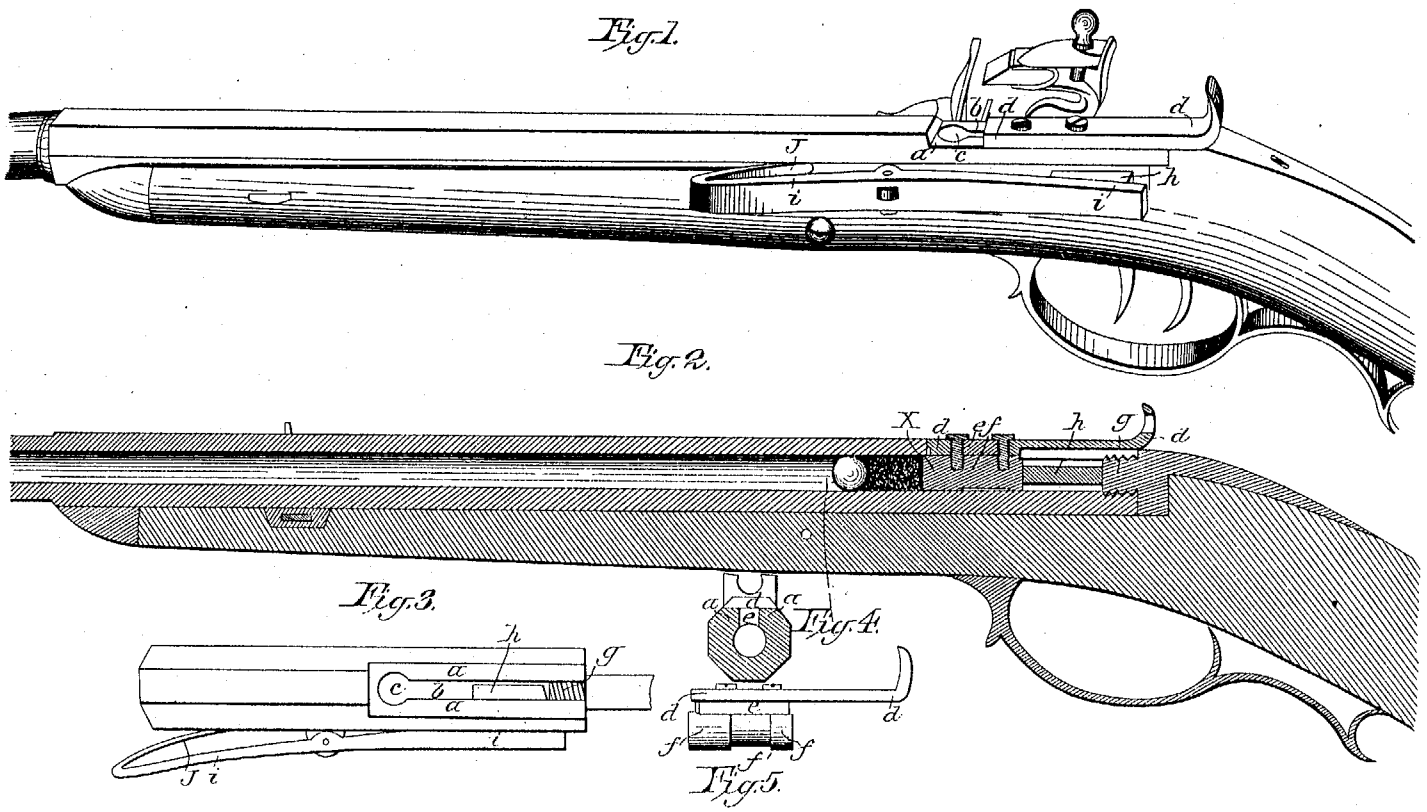
N. PETERS, Photo-Lithographer, Washington, D. C.

UNITED STATES PATENT OFFICE.

WILLIAM JENKS, OF COLUMBIA, SOUTH CAROLINA.

IMPROVEMENT IN FIRE-ARMS.

Specification forming part of Letters Patent No. 747, dated May 25, 1838; Additional Improvement No. 22, dated July 9, 1839.

*To all whom it may concern:*

Be it known that I, WILLIAM JENKS, of Columbia, in the district of Richland and State of South Carolina, have invented certain Improvements in the Manner of Constructing Fire-Arms, which improvements I am desirous of attaching to, so as to make a part of, my specification accompanying Letters Patent for an improvement in fire-arms, granted to me on the 25th day of May, 1838; now, be it known that the following is a full and exact description of the new improvements made by me since the granting of the above-named Letters Patent.

Instead of the slide, as used in my first improvement, for the purpose of drawing back the cylindrical plug to admit the charge, I employ a jointed lever, which, by means of a connecting-link, produces this effect when the lever is raised, and forces the plug forward upon the charge when replaced. The joints of this apparatus are so arranged that the reaction of the plug when the discharge is made has no tendency whatever to raise the lever, but causes it to press the more firmly down upon its seat. By this arrangement I dispense with the stop and slide-spring and their appendages, as described by me in the specification to which this is appended.

In the accompanying drawings, Figure 6 is a top view of the gun with the lever raised, and the plug consequently retracted. Fig. 7 is a view of the gun with the lever closed; Fig. 8, a longitudinal vertical section exhibiting the interior arrangement.

A is the plug, connected at B by a knuckle-joint to the connecting-link C.

D is the lever, having its fulcrum at E, by which it is firmly connected with the stock. In Fig. 8 it is shown as closed down and the plug forced forward, the dotted lines in the same figure showing the position of the respective parts when the lever is raised. The connecting-link C is attached to the lever by a knuckle-joint at F, and when the lever is down the axis of the joint F is a little below the axis of the fulcrum E in their relationship to a line parallel with the axis of the barrel, in consequence of which any force upon the plug A, tending to drive it back, tends to force the lever down.

G is a thumb-piece, by which to raise the lever; H, a spring acting upon its lower end and detaining it in place.

What I claim as my invention is—

The above modification of my fire-arms, in the manner of combining and connecting the plug, the connecting-link, and the lever, so as to operate substantially in the manner above set forth.

WM. JENKS.

Witnesses:

LOUTON THORN,

W. THOMPSON.